(12) United States Patent
Yang

(10) Patent No.: US 11,956,550 B2
(45) Date of Patent: Apr. 9, 2024

(54) ELECTRONIC DEVICE AND IN-SCREEN OPTICAL DETECTION ASSEMBLY

(71) Applicant: Honor Device Co., Ltd., Shenzhen (CN)

(72) Inventor: Shengxi Yang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 4 days.

(21) Appl. No.: 17/776,853

(22) PCT Filed: Nov. 4, 2021

(86) PCT No.: PCT/CN2021/128602
§ 371 (c)(1),
(2) Date: May 13, 2022

(87) PCT Pub. No.: WO2022/100503
PCT Pub. Date: May 19, 2022

(65) Prior Publication Data
US 2023/0164444 A1    May 25, 2023

(30) Foreign Application Priority Data

Nov. 13, 2020  (CN) .......................... 202011270729.2

(51) Int. Cl.
*H04N 23/71* (2023.01)
*G01J 1/42* (2006.01)
*H04N 23/55* (2023.01)

(52) U.S. Cl.
CPC ............ *H04N 23/71* (2023.01); *G01J 1/4204* (2013.01); *H04N 23/55* (2023.01)

(58) Field of Classification Search
CPC ........ H04N 23/71; H04N 23/88; H04N 23/60; H04N 23/55; G01J 1/4204
(Continued)

(56) References Cited

U.S. PATENT DOCUMENTS 6,697,137 B2 * 2/2004 Nemoto ............ G02F 1/133555
349/82
8,610,842 B2 * 12/2013 Kim ....................... H04N 23/57
348/333.08
(Continued)

FOREIGN PATENT DOCUMENTS

CN  107370851 A  11/2017
CN  108600460 A  9/2018
(Continued)

*Primary Examiner* — Pritham D Prabhakher
(74) *Attorney, Agent, or Firm* — Conley Rose, P.C.

(57) ABSTRACT

An electronic device and an in-screen optical detection assembly. The electronic device includes a middle frame, a screen, a circuit board, and a color temperature detection assembly, where the screen includes a display and a cover plate located on one side of the display; the middle frame is located between the display and the circuit board and provided with a first through hole; the optical detection assembly includes a light shield body and a light sensor, where the light shield body is provided with a light hole, a first end of the light shield body is connected to the circuit board, and a second end of the light shield body passes through the first through hole and extends to one side of the screen facing the middle frame; and the light sensor is disposed on the circuit board and located in the light hole.

19 Claims, 5 Drawing Sheets

(58) Field of Classification Search
USPC .......................................................... 348/335
See application file for complete search history.

(56) References Cited

U.S. PATENT DOCUMENTS

| | | | |
|---|---|---|---|
| 9,143,668 B2* | 9/2015 | Mathew | G06F 1/1626 |
| 9,866,676 B1* | 1/2018 | Diebel | G03B 17/02 |
| 10,267,976 B1* | 4/2019 | Zheng | G02B 6/0045 |
| 10,277,731 B2* | 4/2019 | Diebel | H04W 52/0296 |
| 10,334,148 B2* | 6/2019 | Kwak | G02F 1/133512 |
| 10,866,464 B2* | 12/2020 | Ma | G02F 1/13318 |
| 11,184,515 B2* | 11/2021 | Jiang | H04N 23/57 |
| 11,303,138 B2* | 4/2022 | Ben-Yehoshua | H02J 7/342 |
| 11,526,047 B2* | 12/2022 | Son | G06F 1/1643 |
| 11,546,452 B2* | 1/2023 | Duan | H04M 1/026 |
| 11,765,945 B2* | 9/2023 | Song | H10K 59/126 |
| 2001/0040658 A1* | 11/2001 | Nemoto | G02F 1/133553 349/113 |
| 2011/0261283 A1* | 10/2011 | Kim | H04N 23/57 349/58 |
| 2012/0105400 A1* | 5/2012 | Mathew | G06F 1/1637 345/207 |
| 2014/0225131 A1* | 8/2014 | Benson | G06F 1/1643 257/82 |
| 2016/0198070 A1* | 7/2016 | Nakano | H04N 23/57 348/374 |
| 2016/0357053 A1* | 12/2016 | Chen | G02B 6/0088 |
| 2017/0187934 A1* | 6/2017 | Kwak | G06F 1/1605 |
| 2018/0146084 A1* | 5/2018 | Diebel | H04B 1/3888 |
| 2021/0058501 A1 | 2/2021 | Duan | |

FOREIGN PATENT DOCUMENTS

| | | |
|---|---|---|
| CN | 108990336 A | 12/2018 |
| CN | 109101083 A | 12/2018 |
| CN | 209964108 U | 1/2020 |
| CN | 111066031 A | 4/2020 |
| CN | 111083256 A | 4/2020 |

* cited by examiner

ELECTRONIC DEVICE AND IN-SCREEN OPTICAL DETECTION ASSEMBLY

CROSS-REFERENCE TO RELATED APPLICATIONS

This application is a U.S. National Stage of International Application No. PCT/CN2021/128602 filed on Nov. 4, 2021, which claims priority to Chinese Patent Application No. 202011270729.2, filed with the China National Intellectual Property Administration on Nov. 13, 2020, both of which are incorporated herein by reference in their entireties.

TECHNICAL FIELD

The present application relates to the field of electronic device technologies, and in particular, to an electronic device and an in-screen optical detection assembly.

BACKGROUND

When an electronic device is used for photographing, due to the influence of an ambient color temperature, color cast may occur to a photographed photo. For example, under the light of an indoor incandescent lamp, a photo photographed by the electronic device may be yellowish. To improve the influence of the ambient color temperature on the photographing effect, some existing electronic devices are usually provided with color temperature sensors to detect the ambient color temperature, so that a photographing effect can be adjusted according to the detected ambient color temperature during photographing. In a current electronic device, the color temperature sensors are each disposed on a rear side of the electronic device and configured to detect an ambient color temperature on a rear side of the electronic device, so as to adjust the photographing effect of a rear camera module. During use of the electronic device, ambient light on the rear side and a screen side is often different. If the photographing effect of a front camera module is adjusted by using the ambient color temperature detected by the color temperature sensor on the rear side, a photo photographed by the front camera module still has a color cast risk.

SUMMARY

The present application provides an electronic device and an in-screen optical detection assembly, to detect an ambient color temperature on a screen side.

According to a first aspect, the present application provides an electronic device, including a middle frame, a screen, a circuit board, and a color temperature detection assembly. The screen includes a display and a cover plate disposed on one side of the display; the middle frame is disposed between the display and the circuit board and provided with a first through hole, and two ends of the first through hole face the display and the circuit board respectively; an optical detection assembly includes a light shield body and a light sensor, where the light shield body includes a first end and a second end that are opposite to each other, the light shield body is provided with a light hole penetrating from the first end to the second end, the first end of the light shield body is connected to the circuit board, and the second end passes through the first through hole and extends to one side of the screen facing the middle frame; and the light sensor is disposed on the circuit board and located in the light hole.

In the foregoing solution, the optical detection assembly is disposed below the screen, and therefore can detect ambient light on the screen side, so that a display image of the screen or a photographing effect of a front camera module of the electronic device can be adjusted according to a result of detection by the light sensor; furthermore, through the arrangement of the light shield body, after passing through the screen, the ambient light can propagate to the light sensor through the light hole of the light shield body, so that a propagation path of the ambient light can be limited, and light inside the electronic device can be blocked. Therefore, the light inside the electronic device can be prevented from entering the light shield body, and accuracy of the result of detection by the light sensor can be improved.

In some possible implementation solutions, the first end of the light shield body may be hermetically connected to the circuit board to prevent the dust inside the electronic device from entering the light hole and reduce a risk that the dust falling on a color temperature sensor affects detection sensitivity of the color temperature sensor. In addition, this arrangement can further reduce risks of light leakage and optical crosstalk at the first end of the light shield body, and improve the light blocking effect of the light shield body.

In specific arrangement, foam may be disposed between the first end of the light shield body and the circuit board, and the foam is squeezed to achieve sealing. Two sides of the foam may be bonded to the light shield body and the circuit board respectively, so as to improve structural reliability of the electronic device.

In some possible implementation solutions, the first end of the light shield body is provided with an extension wall disposed in a circumferential direction of the light shield body, the extension wall is disposed between a middle board and the circuit board, and one side of the extension wall facing the circuit board is hermetically connected to the circuit board, so as to increase a contact area between the light shield body and the foam and achieve better sealing; and the other side of the extension wall facing the middle frame is further fixedly connected to the middle frame by using gum, so as to reliably fix the light shield body in the electronic device.

In some possible implementation solutions, the display is a non-transparent display, the display is provided with a first opening opposite to the first through hole, and the second end of the light shield body may pass through the first through hole and the first opening in sequence and extend to one side of the cover plate facing the middle frame. In this case, after passing through the cover plate, the ambient light can be propagated to the light sensor through the light hole inside the light shield body.

In the foregoing solution, a gap is provided between the second end of the light shield body and the cover plate, so that when the screen and the middle frame are assembled, the second end of the light shield body can be prevented from squeezing the cover plate, thereby ensuring structural stability of the electronic device.

In specific arrangement, the foregoing gap may have a size of 0.11 mm to 0.13 mm. It has been verified by experiments that when the gap is within this range, the electronic device can be assembled reliably, and light emitted by the display may be prevented from reaching the light hole through the gap, thereby improving accuracy of the result of detection by the light sensor.

In some possible implementation solutions, the display is a transparent display, and the second end of the light shield body may pass through the first through hole and extend to one side of the display facing the middle frame. In this case, after passing through the cover plate and the display in sequence, the ambient light can be propagated to the light sensor through the light hole inside the light shield body.

Similarly, in the foregoing solution, a gap is provided between the second end of the light shield body and the display, so that when the screen and the middle frame are assembled, the second end of the light shield body can be prevented from squeezing the display, thereby ensuring structural stability of the electronic device. In specific arrangement, the foregoing gap may have a size of 0.11 mm to 0.13 mm.

In some possible implementation solutions, a light-shielding black glue layer is disposed on a surface of the light shield body to improve the light-shielding performance of the light shield body. In specific arrangement, the light-shielding black glue layer may be an ink layer.

In some possible implementation solutions, the optical detection assembly further includes a lens disposed in the light hole, a light inlet side of the lens is disposed toward the second end of the light shield body, and a light outlet side of the lens is disposed toward the light sensor. The lens can converge ambient light from each incident direction into a beam that propagates approximately in an axis direction of the light hole, thereby increasing the density of ambient light propagating to the color temperature sensor, and improving the accuracy of the detection result of the color temperature sensor.

In some possible implementation solutions, the light hole may include a first hole segment and a second hole segment, where the first hole segment is disposed close to the first end of the light shield body, the second hole segment is disposed close to the second end of the light shield body, and a first stepped surface disposed toward the first end of the light shield body is formed between the first hole segment and the second hole segment; a peripheral side of the lens is provided with a second stepped surface disposed toward the second end of the light shield body; when the lens is installed in the light hole, one end of the light inlet side of the lens extends into the second hole segment, the second stepped surface of the lens is opposite to the first stepped surface in the light hole, and the two stepped surfaces are bonded to each other by using gum, so as to fix the lens in the light hole.

In some possible implementation solutions, the optical detection assembly may further include a light homogenizing film, where the light homogenizing film is fixed to the light outlet side of the lens, and may be configured to convert light emitted from the light outlet side of the lens into a surface light source, so that each photosensitive region of the color temperature sensor can receive uniform light with similar intensities, thereby improving the detection accuracy of the color temperature sensor.

Because the light homogenizing film is usually white, to prevent the screen side of the electronic device from appearing white in appearance, the lens may be dark in color, so that the color of the light homogenizing film can be blocked, so as to improve appearance quality of the electronic device.

In specific arrangement, the light sensor may be a color temperature sensor for detecting an ambient color temperature, or an ambient light sensor for detecting an intensity of ambient light, or the like.

In some possible implementation solutions, the middle frame may be further provided with a second through hole. The electronic device further includes a camera module, where the camera module includes an optical lens, and a light inlet side of the optical lens may pass through the second through hole and extend to one side of the screen facing the middle frame. In this way, the ambient light result of detection by the light sensor can be used to adjust the photographing effect of the camera module, thereby improving the color cast of a photographed photo.

According to a second aspect, the present application further provides an electronic device, including a middle frame, a screen, a circuit board, an optical detection assembly, and a camera module. The middle frame is located between the display and the circuit board and provided with a first through hole and a second through hole. The screen includes a display and a cover plate located on one side of the display that faces away from the middle frame. The display is provided with a first opening and a second opening at positions corresponding to the first through hole and the second through hole respectively, and the first opening may communicate with the second opening to be a whole. The optical detection assembly includes a light shield body, a light sensor, a lens, and a light homogenizing film, where a first end of the light shield body is provided with an extension wall disposed in a circumferential direction of the light shield body, the extension wall is disposed between a middle board and the circuit board, one side of the extension wall facing the circuit board is hermetically connected to the circuit board, the other side of the extension wall facing the middle frame may be further fixedly connected to the middle frame by using gum, so as to reliably fix the light shield body in the electronic device; a second end of the light shield body passes through the first through hole and the first opening in sequence and extends to one side of the cover plate facing the middle frame; the light shield body is provided with a light hole penetrating from the first end to the second end, the light hole may include a first hole segment and a second hole segment, the first hole segment is disposed close to the first end of the light shield body, the second hole segment is disposed close to the second end of the light shield body, and a first stepped surface disposed toward the first end of the light shield body is formed between the first hole segment and the second hole segment; the light sensor is disposed on the circuit board and located in the light hole; the lens is disposed in the light hole, a light inlet side of the lens is disposed toward the second end of the light shield body, a light outlet side of the lens is disposed toward the light sensor, a peripheral side of the lens is provided with a second stepped surface disposed toward the second end of the light shield body, one end of the light inlet side of the lens extends into the second hole segment, and the second stepped surface of the lens is fixedly connected to the first stepped surface in the light hole, and the lens is dark in color; the light homogenizing film is fixed to the light outlet side of the lens, and may be configured to convert light emitted from the light outlet side of the lens into a surface light source; the camera module includes an optical lens, and a light inlet side of the optical lens may pass through the second through hole and extend into the second opening, to collect ambient light entering the electronic device from the cover plate, where a distance between the optical lens and the shield body of the optical detection assembly is less than 1 cm.

In the foregoing solution, the optical detection assembly is disposed below the screen, and therefore can detect ambient light on the screen side, so that a photographing effect of the camera module can be adjusted according to a result of detection by the light sensor. In addition, the shape of the light shield body is similar to the shape of the optical lens. The second end of the light shield body and the lens located in the light shield body, which are seen by a user through the cover plate from the screen side of the electronic device, are basically the same as the light inlet side of the optical lens. That is, seen from the screen side the optical detection assembly is shaped like a camera, and therefore a visual effect of the appearance of the electronic device can be optimized to a certain extent.

According to a third aspect, the present application further provides an in-screen optical detection assembly, including a light shield body and a light sensor, where the light shield body includes a first end and a second end that are opposite to each other, and the light shield body is provided with a light hole penetrating from the first end to the second end of the light shield body; the light sensor is located in the light hole, and a photosensitive region of the light sensor is disposed toward the second end.

In the foregoing solution, the in-screen optical detection assembly can detect ambient light on the screen side of the electronic device, so that a display image of the screen or a photographing effect of a front camera module of the electronic device can be adjusted according to a result of detection by the light sensor; furthermore, through the arrangement of the light shield body, a propagation path of the ambient light can be limited, and light outside the in-screen optical detection assembly can be blocked. Therefore, the external light can be prevented from entering the light shield body, and accuracy of the result of detection by the light sensor can be improved.

In some possible implementation solutions, the optical detection assembly further includes a lens disposed in the light hole, a light inlet side of the lens is disposed toward the second end of the light shield body, and a light outlet side of the lens is disposed toward the light sensor. The lens can converge ambient light from each incident direction into a beam that propagates approximately in an axis direction of the light hole, thereby increasing the density of ambient light propagating to the color temperature sensor, and improving the accuracy of the detection result of the color temperature sensor.

In some possible implementation solutions, the light hole may include a first hole segment and a second hole segment, where the first hole segment is disposed close to the first end of the light shield body, the second hole segment is disposed close to the second end of the light shield body, and a first stepped surface disposed toward the first end of the light shield body is formed between the first hole segment and the second hole segment; a peripheral side of the lens is provided with a second stepped surface disposed toward the second end of the light shield body; when the lens is installed in the light hole, one end of the light inlet side of the lens extends into the second hole segment, the second stepped surface of the lens is opposite to the first stepped surface in the light hole, and the two stepped surfaces are bonded to each other by using gum, so as to fix the lens in the light hole.

In some possible implementation solutions, the light shield body has a cylindrical structure, and includes a first shaft segment and a second shaft segment, where the first shaft segment is disposed corresponding to the first hole segment, the second shaft segment is disposed corresponding to the second hole segment, and a diameter of the first shaft segment is greater than a diameter of the second shaft segment. In this way, when the first hole segment and the second hole segment are formed, the influence on the structural strength of the light shield body can be reduced.

In some possible implementation solutions, the optical detection assembly may further include a light homogenizing film, where the light homogenizing film is fixed to the light outlet side of the lens, and may be configured to convert light emitted from the light outlet side of the lens into a surface light source, so that each photosensitive region of the color temperature sensor can receive uniform light with similar intensities, thereby improving the detection accuracy of the color temperature sensor.

Because the light homogenizing film is usually white, to prevent the screen side of the electronic device from appearing white in appearance, the lens may be dark in color, so that the color of the light homogenizing film can be blocked, so as to improve appearance quality of the electronic device.

In specific arrangement, the light sensor may be a color temperature sensor for detecting an ambient color temperature, or an ambient light sensor for detecting an intensity of ambient light, or the like.

REFERENCE NUMERALS

Figure 1:
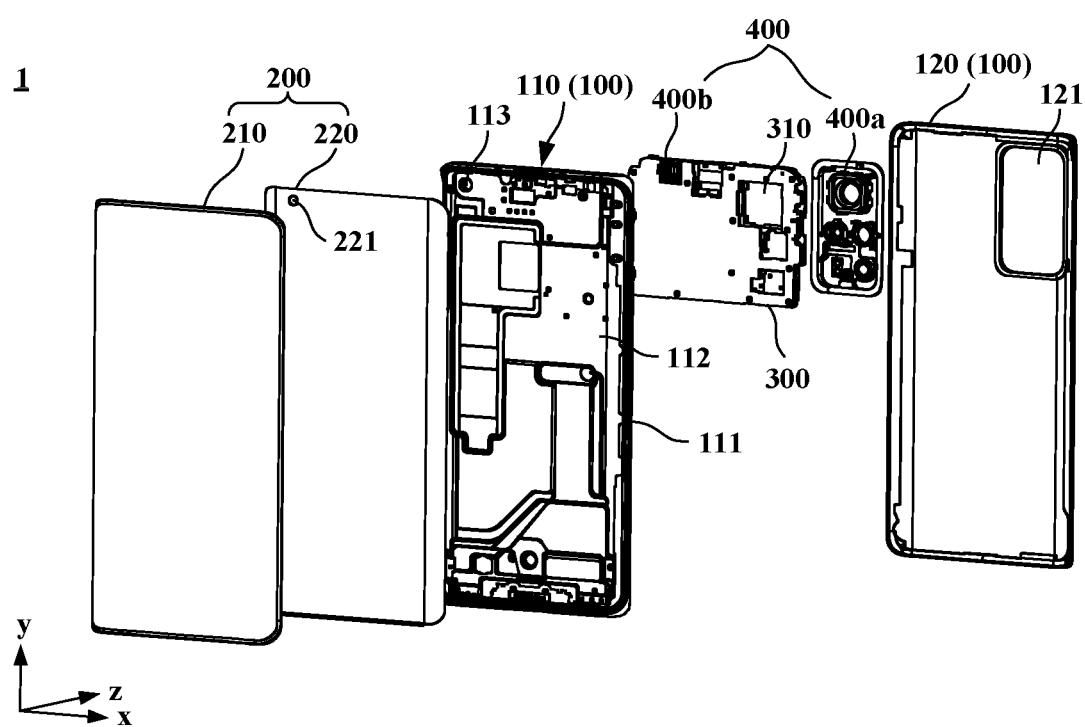
FIG. 1 is a partially exploded schematic diagram of an electronic device 1 provided in an embodiment of the present application.

1—electronic device; 100—housing; 200—screen; 300—circuit board; 400—camera module; 110—middle frame; 120—rear cover; 111—frame body; 112—middle board; 210—first cover plate; 220—display; 310—avoidance space; 113—through hole; 121—light inlet hole; 400a—rear camera module; 221—opening; 400b—front camera module; 410—optical lens; 420—photosensitive chip; 430—module circuit board; 440—optical filter; 500—optical detection assembly; 10—color temperature sensor; 113a—first through hole; 113b—second through hole; 221a—first opening; 221b—second opening; 20—light shield body; 21—first end of the light shield body; 22—second end of the light shield body; 23—light hole; 30—foam; 24—extension wall; 40—lens; 41—light inlet side; 42—light outlet side; 25—first shaft segment; 26—second shaft segment; 231—first hole segment; 232—second hole segment; 233—first stepped surface; 41—second stepped surface; 50—light homogenizing film.

DESCRIPTION OF EMBODIMENTS

The technical solutions in the implementations of the present application are clearly and completely described below in conjunction with the accompanying drawings in the implementations of the present application.

It should be noted that in this specification, similar reference numerals and letters indicate similar items in the following accompanying drawings. Therefore, once an item is defined in one accompanying drawing, the item does not need to be further defined and explained in the subsequent accompanying drawings.

In the description of the present application, it should be noted that the orientation or positional relationship indicated by the terms such as "middle", "upper", "lower", "left", "right", "vertical", "horizontal", "inner", or "outer" is based on the orientation or positional relationship shown in the accompanying drawings, which is only for ease of describing the present application and simplifying the description, and does not indicate or imply that the indicated apparatus or element must have a specific orientation and be constructed and operated in a specific orientation, and therefore it cannot be understood as a limitation to the present application. In addition, the terms "first" and "second" are used for descriptive purposes only and should not to be construed as indicating or implying relative importance.

In the description of the present application, it should be noted that, unless otherwise specified and defined, the terms "install", "connection", and "connected to" should be comprehended in a broad sense. For example, the connection may be comprehended as being fixedly connected, detachably connected, or integrally connected; or mechanically connected or electrically connected; or directly connected or indirectly connected by using an intermediate medium, or in an internal communication between two elements. The specific meanings about the foregoing terms in the present application may be understood by a person of ordinary skill in the art according to specific circumstances.

Referring to FIG. 1, FIG. 1 is a partially exploded schematic diagram of an electronic device 1 provided in an embodiment of the present application. The electronic device 1 may be a mobile phone, a tablet personal computer (tablet personal computer), a camera, a smart TV, a smart screen, a notebook computer, an electronic paper, or the like. The electronic device 1 in the embodiment shown in FIG. 1 is described by using a mobile phone as an example.

In this embodiment of the present application, the electronic device may include a housing 100, a screen 200, a circuit board 300, and a camera module 400. It should be noted that FIG. 1 and the following related accompanying drawings only schematically show some components included in the electronic device 1, and actual shapes, actual sizes, actual positions and actual configurations of these components are not limited by FIG. 1 and the following accompanying drawings.

For ease of description, a width direction of the electronic device 1 is defined as an x-axis, a length direction of the electronic device 1 is a y-axis, and a thickness direction of the electronic device 1 is a z-axis, where the x-axis, the y-axis, and the z-axis are perpendicular to each other. Understandably, a coordinate system of the electronic device 1 may be flexibly set according to specific actual needs.

The housing 100 may include a front cover 210, a middle frame 110, and a rear cover 120. In specific arrangement, the middle frame 110 may include a frame body 111 and a middle board 112 disposed inside the frame body 111. The rear cover 120 is fixed to one side of the frame body 111, and the rear cover 120 and the middle board 112 are opposite to each other and spaced. In an implementation, the rear cover 120 may be fixedly connected to the middle frame 110 by using an adhesive. In another implementation, the rear cover 120 and the middle frame 110 may alternatively form an integrally formed structure, that is, the rear cover 120 and the middle frame 110 are an integral structure. The front cover 210 is fixed to the other side of the frame 111, and the front cover 210, the frame body 111, and the rear cover 120 jointly enclose the inside of the electronic device 1. The inside of the electronic device 1 may be used to place devices of the electronic device 1, such as the circuit board 300, the camera module 400, a battery, a receiver, and a microphone. In an implementation, the front cover 210 may be fixedly connected to the frame body 111 by using an adhesive. In another implementation, two sides of the front cover 210 (for example, two sides in an x-axis direction) may further extend to the position of the rear cover 120 in a z-axis direction and be fixedly connected to the rear cover 120. In this case, the frame body 111 may be located around the electronic device 1 or only on an upper side and a lower side of the electronic device 1 (that is, two sides in a y-axis direction). In addition, when two sides of the front cover 210 extend to the position of the rear cover 120, the front cover 210 and the rear cover 120 may alternatively form an integrally formed structure, that is, the front cover 210 and the rear cover 120 are a whole.

With continued reference to FIG. 1, in this embodiment, the screen 200 is fixed to the other side of the middle frame 110 opposite to the rear cover. In this case, the screen 200 is opposite to the rear cover 120. The screen 200 may be configured to display images, text, and the like. The screen 200 may be a flat screen or a curved screen. The screen 200 includes a cover plate and a display 220, where the cover plate may be the front cover 210 described above, and the cover plate is stacked on one side of the display 220 that faces away from the middle frame 110. It should be noted that hereinafter, reference numerals of the cover plate and the front cover 210 are the same. The cover plate 210 may be closely attached to the display 220, and may be mainly used to protect the display 220 and prevent dust. The cover plate 210 is made of a transparent material, which, for example, may be glass or plastic. The display 220 may be a liquid crystal display (Liquid Crystal Display, LCD for short), an organic light-emitting diode (organic light-emitting diode, OLED for short) display, an active-matrix organic light-emitting diode (active-matrix organic light-emitting diode, AMOLED for short) display, a quantum dot light emitting diodes (quantum dot light emitting diodes, QLED for short) display, a micro light emitting diode (Micro Light Emitting Diode, Micro LED for short) display, or the like. The display 220 may be a transparent display or a non-transparent display, and no limitation is imposed on this in the present application. When the display 220 is a transparent display, ambient light can pass through the transparent display and enter the electronic device. When the display is a non-transparent display, the display can block the ambient light, and in this case, the ambient light cannot pass through the display.

In another implementation, the display 220 and two sides of the cover plate 210 may extend to the position of the rear cover 120 in the z-axis direction together. This can increase the size of the screen 200 and improve the overall performance and appearance quality of the electronic device 1.

In addition, in some other possible implementations, the rear cover 120 may alternatively be a screen, that is, the rear cover 120 may also be used for display. In this case, the rear cover 120 and the screen 200 on a front side of the electronic device 1 may be used as an integral curved screen, or the rear cover 120 and the screen 200 on the front side of the electronic device 1 may be designed independently to display different contents.

In some implementations, the electronic device may alternatively be a mobile phone with a foldable screen. In this case, the electronic device may further include a rotating shaft mechanism, and the housing includes two sub-housings disposed on two sides of the rotating shaft mechanism. The two sub-housings are separately and rotatably connected to the rotating shaft mechanism, so as to achieve switching of the mobile phone between an unfolded state and a folded state when rotating around the rotating shaft mechanism. The screen is fixed to one side of the two sub-housings, and to adapt to the folded and unfolded states of the mobile phone, the screen may be specifically a flexible screen.

With continued reference to FIG. 1, the circuit board 300 is fixed inside the electronic device 1. In an implementation, the circuit board 300 may be fixed to one side of the middle board 112 facing the rear cover, and the circuit board 300 is located between the middle board 112 and the rear cover 120. Understandably, the circuit board 300 may be a rigid circuit board, a flexible circuit board, or a rigid-flex circuit board. The circuit board 300 may be an epoxy board (FR-4), a Rogers dielectric board, a FR-4 and Rogers mixed dielectric board, or the like. Herein, FR-4 is a code name for a flame-resistant material grade, and the Rogers dielectric board is a high-frequency board. In addition, the circuit board 300 may be configured to carry electronic devices such as a chip, a capacitor, and an inductor, and may electrically connect the electronic devices. The chip may be a central processing unit (central processing unit, CPU for short), a graphics processing unit (graphics processing unit, GPU for short), a digital signal processing (digital signal processing, DSP for short) chip, a universal flash memory (universal flash storage, UFS for short), or the like.

The camera module 400 is fixed in the housing 100, and is configured to enable the electronic device 1 to achieve functions such as photographing or video recording. In an embodiment, the camera module 400 may be fixed to one side of the middle board 112. The circuit board 300 may be provided with an avoidance space 310, and the avoidance space 310 may be in a shape matching a shape of the camera module 400, for example, a rectangular shape illustrated in FIG. 1. Certainly, in other implementations, the avoidance space 310 may alternatively be circular, oval or in an irregular shape or the like, and no specific limitation is imposed on this in the present application. The camera module 400 is located in the avoidance space 310. In this way, in the z-axis direction, the camera module 400 and the circuit board 300 have an overlapping region, thereby avoiding the increase of the thickness of the electronic device 1 caused by the stacking of the camera module 400 on the circuit board 300. In other embodiments, the circuit board 300 may alternatively be provided with no avoidance space 310. In this case, the camera module 100 may be stacked directly on the circuit board 300 or spaced from the circuit board 300 by using other supporting structures.

In an embodiment, the electronic device may further include connecting devices such as a mobile industry processor interface (mobile industry processor interface, MIPI for short) and a general-purpose input/output (general-purpose input/output, GPIO for short). The MIPI may be configured to connect a CPU to a peripheral device such as the display or the camera module. The MIPI includes a camera serial interface (camera serial interface, CSI for short), a display serial interface (display serial interface, DSI for short), or the like. In some embodiments, the CPU communicates with the camera module by using the CSI to achieve a photographing function of the electronic device. The CPU communicates with the display by using the DSI to achieve a display function of the electronic device.

The GPIO interface may be configured by using software. The GPIO interface may be configured as a control signal or a data signal. In some embodiments, The GPIO interface may be configured to connect the CPU to camera module or the like. The GPIO interface may alternatively be configured as an I2C interface, an I2S interface, an MIPI, a universal asynchronous receiver/transmitter (universal asynchronous receiver/transmitter, UART for short), or the like.

The electronic device may achieve a photographing function by using an ISP, the camera module, a video codec, a GPU, the display, an application processor, or the like.

The ISP is configured to process data fed back by the camera module. For example, during photographing, a shutter is opened, so that light is transmitted to a photosensitive element of a camera by using a lens, and a light signal is converted into an electrical signal. The photosensitive element of the camera transmits the electrical signal to the ISP for processing, and the signal is converted into an image visible to naked eyes. The ISP may further optimize noise, brightness and a skin color of an image by using an algorithm. The ISP may further optimize parameters such as exposure and a color temperature of a photographing scenario. In some embodiments, the ISP may be disposed in the camera module.

In some embodiments, the electronic device may include 1 or N camera modules, where N is a positive integer greater than 1. In an example, the camera module may include a wide-angle camera, a photographic camera, a 3D depth camera (such as a structured light camera, or a time-of-flight (time-of-flight, ToF) camera), a telephoto camera, or the like.

In addition, according to different light inlet directions of the camera module 400, the electronic device 1 can achieve front-facing photographing or rear-facing photographing. For example, when the light inlet side of the camera module 400 is disposed toward one side of the rear cover 120, the electronic device 1 can achieve rear-facing photographing; when the light inlet side of the camera module 400 is disposed toward one side of the screen 200, the electronic device 1 can achieve front-facing photographing. In this case, the middle board 112 may be provided with a through hole 113, so that the light inlet side of the camera module 400 can receive ambient light from the screen 200 side through the through hole 113. For ease of description, hereinafter, a camera module for achieving rear-facing photographing is referred to as a rear camera module 400a, and a camera module for achieving front-facing photographing is referred to as a front camera module 400b.

The rear cover 120 of the electronic device 1 with the rear-facing photographing function is provided with a light inlet hole 121, and the light inlet hole 121 enables the inside of the electronic device 1 to communicate with the outside of the electronic device 1. A protective cover plate (not shown in the figure) is provided at the light inlet hole 121, and the protective cover plate can separate the inside of the electronic device 1 from the outside of the electronic device 1, so as to prevent external water or dust from entering the electronic device 1 through the light inlet hole 121. The protective cover plate is made of a transparent material, which, for example, may be glass or plastic. A light inlet side of the rear camera module 400a is opposite to the light inlet hole 121, and ambient light outside the electronic device 1 can pass through the protective cover plate and enter the inside of the electronic device 1, and then can be collected by the rear camera module 400a to form an image or a video.

In other embodiments, the rear camera module 400a can also collect ambient light passing through the rear cover 120. Specifically, the rear cover 120 is made of a transparent material, such as glass or plastic. A surface of the rear cover 120 facing the inside of the electronic device 1 is partially coated with ink and partially uncoated with ink. In this case, a region uncoated with ink may form a light-transmitting region. When ambient light enters the inside of the electronic device 1 through the light-transmitting region, the rear camera module 400a can collect the ambient light. That is, the electronic device 1 may not need to be provided with the light inlet hole 121 and does not need to be provided with the protective cover plate, and the electronic device 1 has better integrity and a lower cost.

In an implementation, the display 220 of the electronic device 1 with the front-facing photographing function is provided with an opening 221, and the opening 221 is specifically opposite to the through hole 113 in the middle board 112. It should be noted that, the opening is opposite to the through hole, which may be understood as that projections of the two holes in an xy plane overlap or partially overlap, so that the light inlet side of the front camera module 400b can pass through the through hole 113 and the opening 221 in sequence, and collect ambient light entering the electronic device 1 from the cover plate 210, to form an image or a video.

Understandably, when the electronic device 1 uses a transparent display, no opening needs to be provided in the display 220, and the light inlet side of the front camera module 400b extends into the through hole 113, so as to collect ambient light entering the electronic device 1 from the cover plate 210 and the display 220.

When the electronic device 1 is used for photographing, due to the influence of an ambient color temperature, color cast may occur to a photographed photo. For example, under the light of an indoor incandescent lamp, a photo photographed by the electronic device 1 may be yellowish. This is because a photosensitive chip of the camera module 400 is generally designed and produced according to a standard color temperature. Therefore, only when the color temperature of a photographing environment is the same as the standard color temperature, it is possible to exclude a photo with the same color as the natural light. Color cast will occur to the photo if the color temperature of the photographing environment is above or below the standard color temperature.

It should be noted that the color temperature is a unit of measurement that indicates color components contained in light. Theoretically, a blackbody temperature refers to a color of an absolute blackbody after heating from absolute zero (−273° C.). After being heated, the blackbody gradually turns from black to red, to yellow, to white, and finally emits blue light. When heated to a certain temperature, a spectral component contained in the light emitted by blackbody is referred to as the color temperature at this temperature. A higher temperature of the "blackbody" indicates more blue components in the spectrum and less red components. The color temperature is usually expressed by using Kelvin temperature (K). It is generally considered that the color temperature of standard white light is 6500 K.

To improve the influence of the ambient color temperature on the photographing effect, some existing electronic devices are usually provided with color temperature sensors to detect the ambient color temperature, so that a photographing effect can be adjusted according to the detected ambient color temperature during photographing. Specifically, when the color temperature sensor detects that the ambient color temperature is excessively low, the electronic device will increase the color temperature of an image during photographing, that is, in layman's terms, a blue tone is added to the image to photograph a photo with a normal color temperature. When the color temperature sensor detects that the ambient color temperature is excessively high, the electronic device will lower the color temperature of the image during photographing, that is, a red tone is added to the image, so as to photograph a photo with a normal color temperature.

In some embodiments, the color temperature sensor is disposed on a rear cover side of the electronic device and configured to detect an ambient color temperature on a rear side of the electronic device, so as to adjust the photographing effect of the rear camera module. During use of the electronic device, ambient light on the rear cover side and a screen side is often different. If the photographing effect of a front camera module is adjusted by using the ambient color temperature detected by the color temperature sensor on the rear cover side, a photo photographed by the front camera module still has a color cast risk.

In some embodiments, the electronic device further includes an optical detection assembly configured to detect an ambient color temperature on a screen side, that is, an in-screen optical detection assembly, so that when the electronic device photographs a photo by using the front camera module, the photographing effect can be adjusted according to the ambient color temperature detected by the optical detection assembly, thereby improving imaging quality of the front camera module.

Figure 2:
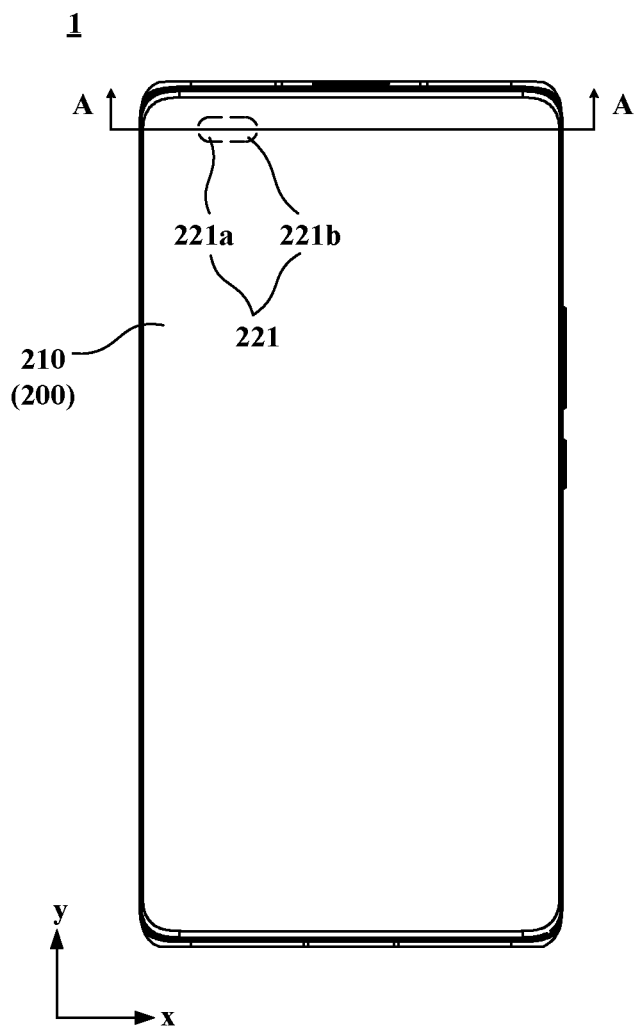
FIG. 2 is a front view of an electronic device provided in an embodiment of the present application.
Figure 3:
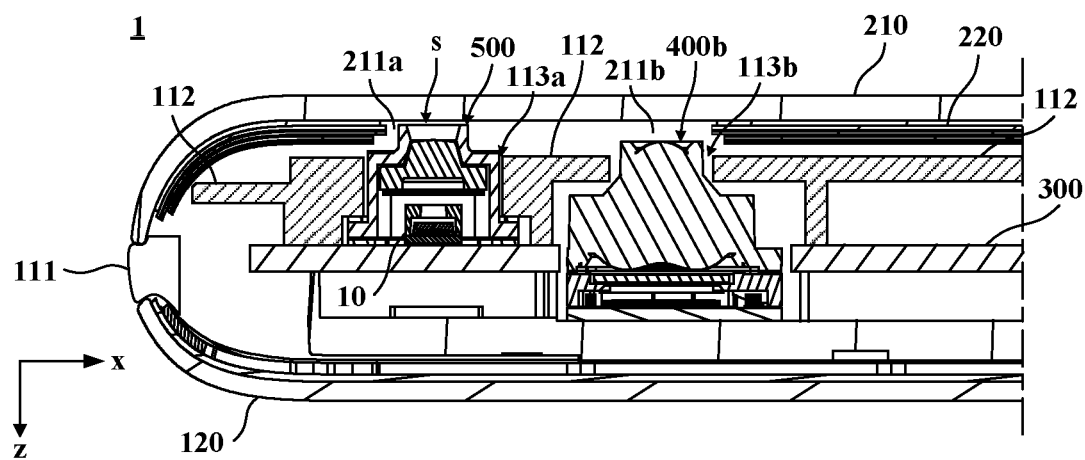
FIG. 3 is a partial sectional view of the electronic device in FIG. 2 in a direction A-A.
Figure 4:
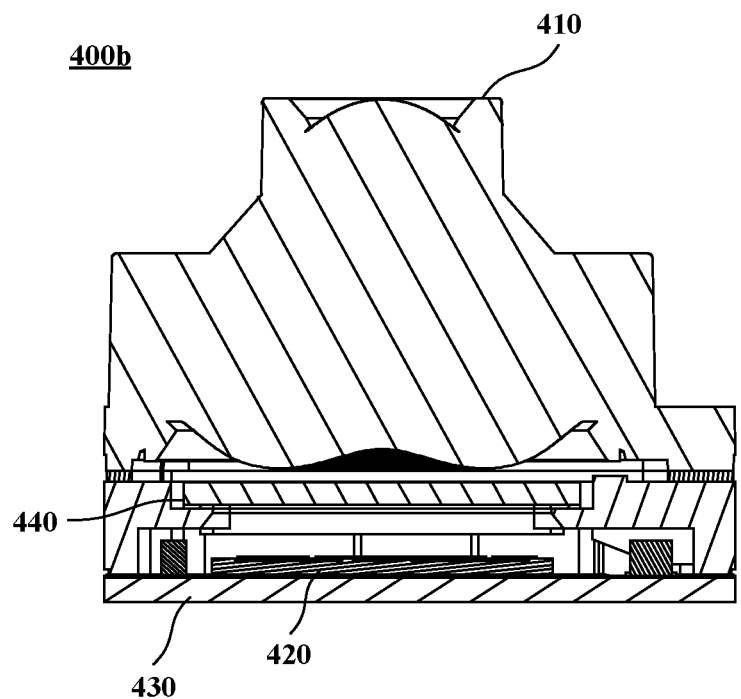
FIG. 4 is a sectional view of a front camera module provided in an embodiment of the present application in the direction A-A.

Referring to FIG. 2, FIG. 3 and FIG. 4 together, FIG. 2 is a front view of the electronic device in FIG. 1, FIG. 3 is a partial sectional view of the electronic device in FIG. 2 in a direction A-A, and FIG. 4 is a sectional view of a front camera module provided in an embodiment of the present application in the direction A-A. In this embodiment of the present application, the front camera module 400b includes an optical lens 410, a photosensitive chip 420, and a module circuit board 430. An optical axis direction of the optical lens 410 is disposed in the z-axis direction. The module circuit board 430 is fixed to a light outlet side of the optical lens 410. The module circuit board 430 may be electrically connected to the circuit board 300 by using the MIPI, so that signals can be transmitted between the circuit board 300 and the module circuit board 430. The photosensitive chip 420 is fixed to one side of the module circuit board 430 facing the optical lens 410, and the photosensitive chip 420 is electrically connected to the module circuit board 430. An optical image generate by an object by using the optical lens is projected to the photosensitive chip 420. The photosensitive chip 420 may be a charge coupled device (charge coupled device, CCD for short) or a complementary metal-oxide-semiconductor (complementary metal-oxide-semiconductor, CMOS for short) phototransistor. The photosensitive chip 420 can convert an optical signal into an electrical signal, and then transmit the electrical signal to the ISP by using the module circuit board 430 for conversion into a digital image signal. The ISP outputs the digital image signal to the DSP chip for processing. DSP converts the digital image signal into an image signal in a form such as standard RGB or YUV.

In some implementations, the front camera module 400b may further include an optical filter 440, where the optical filter 440 is located on one side of the photosensitive chip 420 facing the optical lens 410. The optical filter 440 may be configured to filter out stray light of the ambient light of the optical lens 410 and make the filtered ambient light propagate to the photosensitive chip 420, thereby ensuring that the image photographed by the electronic device 1 can have better sharpness.

The light inlet side of the optical lens 410 is disposed toward the screen side 200 of the electronic device 1. To facilitate installation of the front camera module 400b and make light from the screen 200 side propagate smoothly into the optical lens 410, in a specific implementation, a through hole 113b is provided in the middle board 122 at a position corresponding to the front camera module 400b, an opening 221b is provided in the display 220 at a position corresponding to the through hole 113b, and the optical lens 410 of the front camera module 400b can pass through the through hole 113b and extend into the opening 221b. In this way, the ambient light can enter the optical lens after passing through the cover plate 210.

Figure 5:
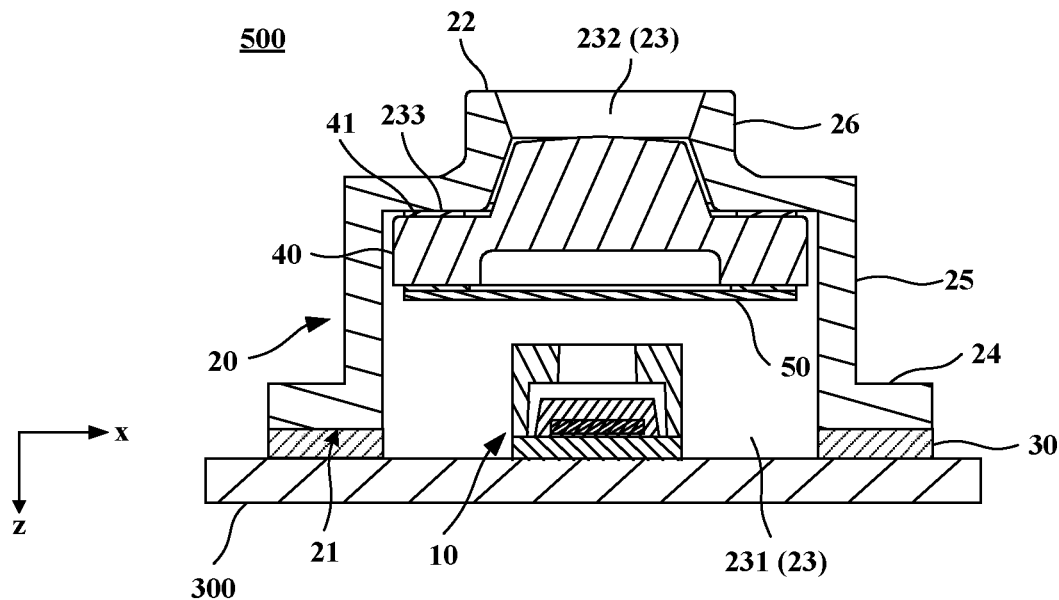
FIG. 5 is a sectional view of an optical detection assembly provided in an embodiment of the present application in the direction A-A.

FIG. 5 is a sectional view of an optical detection assembly provided in an embodiment of the present application in the direction A-A. Referring to FIG. 3 and FIG. 5 together, the optical detection assembly 500 includes a light sensor 10, and the light sensor 10 may be a color temperature sensor for detecting an ambient color temperature, or an ambient light sensor for detecting an intensity of ambient light, or the like. The following is specifically described by using the light sensor 10 as a color temperature sensor, and the color temperature sensor and the light sensor 10 have the same reference numeral in the following. The color temperature sensor 10 may be disposed on the circuit board 300 and located on one side of the circuit board 300 facing the screen 200, that is, the optical detection assembly 500 is located between the cover plate 210 and the circuit board 300. In a specific embodiment, the color temperature sensor 10 may be disposed on the circuit board 300 through welding, so that on one hand, the color temperature sensor 10 can be fixed, and on the other hand, the electrical connection between the sensor 10 and the circuit board 300 can be easily achieved, so that the color temperature sensor 10 can transmit the detected signal to the circuit board 300. For example, a pin of the color temperature sensor 10 may be directly welded to a corresponding electrical connection point on the circuit board 300.

Similarly, to enable the ambient light on the screen 200 side to propagate to the color temperature sensor 10 smoothly, during design, a light-shielding structure between the color temperature sensor 10 and the cover plate 210 may alternatively be opened to form a path that allows light to propagate. Referring to FIG. 3, when the display 220 is a non-transparent display, the light-shielding structure between the color temperature sensor 10 and the cover plate 210 includes a middle board 112 and a display 220. In a specific implementation, a through hole 113a is provided in the middle board 112 at a position corresponding to the color temperature sensor 10, and an opening 221a is provided in the display 220 at a position corresponding to the through hole 113a. In this way, ambient light can be propagated to the color temperature sensor 10 after passing through the cover plate 210, the opening 221a, and the through hole 113a in sequence. For ease of distinction, the two through holes in the middle board 112 corresponding to the color temperature sensor 10 and the optical lens are referred to as the first through hole 113a and the second through hole 113b respectively, and the openings in the display 220 corresponding to the first through hole 113a and the second through hole 113b are referred to as the first opening 221a and the second opening 221b respectively.

In some implementations, the first opening 221a and the second opening 221b may be disposed at intervals, that is, the first opening 221a and the second opening 221b are two separately arranged openings. In this way, when the electronic device is in use, two non-display regions are provided on the screen side, and the two non-display regions are regions in which the first opening 221a and the second opening 221b are located respectively. In specific arrangement, the first opening 221a and the second opening 221b may be adjacent, for example, the two may be adjacently disposed in a left region, a middle region, a right region, or the like at the top of the screen 200. No specific limitation is imposed on this in the present application.

In some other implementations, the first opening 221a and the second opening 221b may alternatively communicate with each other to be a whole, that is, the first opening 221a and the second opening 221b communicate with each other to be one opening. In this way, when the electronic device is in use, only one non-display region is not displayed on the screen, and the shape of the non-display region is the shape after the first opening and the second opening communicate with each other. Specifically, the non-display region may be located at the top of the screen, such as a left region at the top of the screen shown in FIG. 2. Certainly, in some other possible implementations, the non-display region may be located in a central region or a right region at the top, and no limitation is imposed on this in the present application. The shape of the non-display region is not limited to only the long circle shown in FIG. 2. For example, the shape of the non-display region may alternatively be a rectangle, an oval, a circle, a water drop shape, or the like.

It should be noted that when the display 220 is a transparent display, no opening is required in the display 220 at a position corresponding to the first through hole. In this case, the ambient light can pass through the cover plate 210, the transparent display 220, and the first through hole 113a in sequence and then propagate to the color temperature sensor 10. Similarly, no opening is required in the display 220 at a position corresponding to the second through hole 113b, the light inlet side of the optical lens of the front camera module 400b extends into the second through hole 113b, and the ambient light can enter the optical lens 410 after passing through the cover plate 210 and the transparent display 220 in sequence. The following is a detailed description of the process of detecting the ambient color temperature by using the color temperature sensor when the transparent display is adopted for the electronic device.

In this embodiment, after the electronic device enables a color temperature adjustment function or turns on a front camera, the electronic device controls a first region of the display corresponding to the first through hole to display a black image at least twice, and during the interval of two adjacent displays of the black image in the first region, the electronic device controls the first region to display image frames. When the black image is displayed in the first region, the electronic device obtain the ambient color temperature detected by the color temperature sensor. When the black image is displayed in the first region, the electronic device controls a second region other than the first region on the display to display image frames.

The black image may be an image that is presented when the display does not emit light. Alternatively, the black image may be a deep gray image when the display emits light, which may be approximately considered as a black image visually. In the present application, no limitation is imposed on the black image.

It should be noted that the electronic device usually uses a gray value to represent a color depth of points in a black-and-white image. Several levels are provided between white and black according to a logarithmic relationship, generally ranging from 0 to 255, where white is 255, and black is 0. Therefore, a black-and-white picture is also referred to a grayscale image. Therefore, the electronic device can control the gray value of the image displayed on the display to be less than or equal to a preset threshold, so that the electronic device displays a deep gray image, which may be approximately considered as a black image.

In other words, the electronic device can also control the display to display an image with a grayscale being dark gray, light black or black. Specifically, the electronic device divides a brightness change between brightest and darkest parts into several parts, to enable the electronic device to input corresponding screen brightness control. Generally, in visual interpretation, the grayscale may be roughly divided into seven levels: white, gray, light gray, gray, dark gray, light black, and black.

The image frames are a display interface presented by the electronic device to a user, and may include the interface or content specifically displayed to the user.

If a display frequency of the electronic device is f Hz, the electronic device can control the interval between two adjacent displays of a black image in the first region to be greater than or equal to 1/af second. If a black image is displayed periodically, a period of displaying the black image is 1/af second, that is, the interval between two adjacent displays of the black image is equal to 1/af second. a is a positive integer greater than or equal to 1.

a=1 and periodic display of a black image are used as an example for description. The period that the electronic device controls the first region to periodically display a black image is 1/f, that is, the frequency that the electronic device controls the first region to display the black image is the same as the display frequency of the electronic device. Within 1 second, the electronic device may display f image frames, and the black image may also be displayed for f times in the first region. It may be learned that the electronic device controls the first region of the display to display the black image once when displaying each of the f image frames.

It can be learned from the foregoing analysis that the electronic device can control the first region to display a black image once within a time during which each image frame is refreshed, and control the color temperature sensor to detect within a time during which the black image is displayed in the first region, so as to prevent light emitted by the display from interfering with the color temperature sensor and affecting accuracy of the detection result of the ambient color temperature by the color temperature sensor 10.

Figure 6:
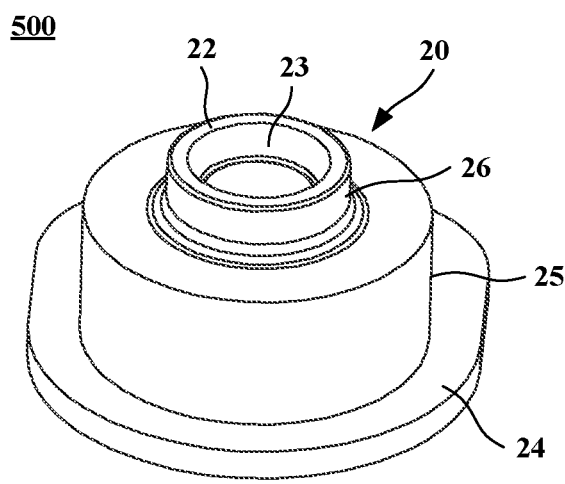
FIG. 6 is a schematic structural diagram of an optical detection assembly provided in an embodiment of the present application.

FIG. 6 is a schematic structural diagram of an optical detection assembly provided in an embodiment of the present application. Referring to FIG. 6, in some implementations, the optical detection assembly 500 further includes a light shield body 20 with a hollow structure, where the light shield body 20 includes a first end 21 and a second end 22 that are opposite to each other. The hollow structure of the light shield body 20 can penetrate from the first end 21 to the second end 22, and the hollow structure can form into a light hole 23 of the light shield body 20. In specific arrangement, the first end 21 of the light shield body 20 is in contact with the circuit board 300, and the color temperature sensor 10 is located in a region defined by the first end 21 of the light shield body 20 on the circuit board 300. The second end 22 of the light shield body 20 passes through the first through hole 113a and the first opening 221a in sequence and extends to one side of the cover plate 210 facing the circuit board 300. In this way, after passing through the cover plate 210, the ambient light can be propagated to the color temperature sensor 10 through the light hole 23 inside the light shield body 20. That is, a lower space of the light hole 23 can be used as an accommodating cavity for accommodating the color temperature sensor 10, and an upper space of the light hole 23 can be used to guide light, so as to guide the ambient light on the screen side from the upper space of the light hole 23 to the color temperature sensor 10 in the lower space. A distance between the optical lens and the shield body of the optical detection assembly is less than 1 cm.

The light shield body 20 may be made of a material with good light-shielding performance, such as metal. Alternatively, the light shield body 20 may be made of a material with ordinary light-shielding performance or light transmission. After the light shield body is made and molded, light-shielding black glue layers, such as ink layers, are disposed on each surface of the shield body to enable the shield body to achieve the light-shielding function. For example, in some implementations, an inner surface, an outer surface, the first end 21 and the second end 22 of the light shield body 20 each may be provided with a light-shielding black glue layer. Certainly, to further improve the light-shielding performance of the light shield body 20, in some implementations, each surface of the shield body made of a material with better light-shielding performance may alternatively be provided with a light-shielding black glue layer. Through the arrangement of the light shield body 20, not only can a propagation path of ambient light be limited, but also the light inside the electronic device 1 (for example, light emitted by the display) can be blocked, so that the light inside the electronic device can be prevented from propagating to the color temperature sensor 10 and affecting accuracy of the detection result of the ambient color temperature by the color temperature sensor 10.

In some implementations, the first end 21 of the light shield body 20 is hermetically connected to the circuit board 300. In this way, on one hand, dust inside the electronic device 1 can be prevented from entering the light hole 23, and a risk that the dust falling on the color temperature sensor 10 affects detection sensitivity of the color temperature sensor 10 is reduced; on the other hand, risks of light leakage and optical crosstalk at the first end 21 of the light shield body 20 can be reduced, and the light blocking effect of the light shield body 20 is improved, thereby further improving accuracy of the detection result by the color temperature sensor 10.

In the foregoing solution, foam 30 may be disposed between the first end 21 of the light shield body 20 and the circuit board 300, and the foam 30 is squeezed to achieve sealing. In specific arrangement, two sides of the foam 30 may be bonded to the light shield body 20 and the circuit board 300 respectively to improve structural reliability of the electronic device 1. Alternatively, filling glue may be provided between the first end 21 of the light shield body 20 and the circuit board 300, to achieve sealing through bonding.

In some implementations, a certain assembly gap s is provided between the second end 22 of the light shield body 20 and the cover plate 210, that is, a gap is provided between a lower surface of the cover plate 210 and an upper surface of the second end 22. An edge of the screen 200 is usually bonded and fixed to the frame body 111 of the middle frame 110 by using insulating gum. If the second end 22 of the light shield body 20 abuts against the cover plate 210, a distance between the screen 200 and the middle frame 110 will tend to increase, and a bonding surface between the insulating gum and the screen 200 or the frame body 111 will have a risk of degumming, which will affect structural stability of the electronic device 1. Through the arrangement of the assembly gap s, when the screen 200 is assembled with the middle frame 110, the second end 22 of the light shield body 20 can be prevented from squeezing the cover plate 210, thereby ensuring structural stability of the electronic device 1.

In a specific implementation, the assembly gap s between the second end 22 of the light shield body 20 and the cover plate 210 may be 0.11 mm to 0.13 mm, for example, the assembly gap s may be 0.11 mm, 0.12 mm, or 0.13 mm. It has been verified by many experiments that when the assembly gap s is within the foregoing range, the electronic device 1 can be assembled reliably, and light emitted by the display 220 may be prevented from reaching the light hole 23 through the assembly gap s, thereby improving accuracy of the result of detection by the color temperature sensor 10.

Understandably, when the electronic device uses a transparent display, the second end 22 of the light shield body 20 can pass through the first through hole 113a and extend to one side of the display 220 facing the circuit board 300. In this case, a gap is provided between the upper surface of the second end 22 of the light shield body 20 and the lower surface of the display 220, and for a specific value of this gap, reference may be made to the setting of the foregoing assembly gap. Details are not described herein.

With continued reference to FIG. 3, FIG. 5, and FIG. 6, in this embodiment of the present application, the first end 21 of the light shield body 20 is further provided with an extension wall 24 disposed in a circumferential direction of the light shield body. The circumferential direction herein may be understood as a direction in which an outer wall surface of the first end 21 of the light shield body 20 extends. The shape of the first end 21 of the light shield body 20 is not limited, and may be, for example, a circle, a rectangle, a long circle, or other regular or irregular shapes. No limitation is imposed on this in the present application. When the light shield body 20 is installed in the electronic device 1, the extension wall 24 may be specifically located between the middle board 112 and the circuit board 300, and one side of the extension wall 24 facing the circuit board 300 is in sealing contact with the circuit board 300 by using the foam 30, so as to increase the contact area between the light shield body 20 and the foam 30 and achieve better sealing. A step is formed on one side of the extension wall 24 facing the middle board 112, and the side of the extension wall 24 facing the middle board 112 abuts against the middle board 112, so as to position the light shield body 20 in the Z-axis direction. In addition, the side of the extension wall 24 facing the middle board 112 may alternatively be bonded to the middle board 112 by using gum, so that the light shield body 20 can be reliably fixed in the electronic device 1.

In some implementations, the extension wall 24 specifically has a ring structure that can be disposed around the first end 21 of the light shield body 20, and the shape of an inner ring of the extension wall 24 matches the shape of the first end 21 of the light shield body 20. The shape of an outer ring of the wall 24 may be similar to the shape of the inner ring, or may be other shapes. No limitation is imposed on this in the present application. Through such an arrangement, the entire annular surface of the extension wall 24 may be bonded to the middle board 112 by using gum, so that the bonding area between the extension wall 24 and the middle board 112 can be increased, thereby increasing the connection strength between the light shield body 20 and the middle board 112.

Understandably, when the color temperature sensor 20 is used to detect the color temperature, more and denser ambient light received by the color temperature sensor 20 indicates higher accuracy of the detection result. In different light source environments, angles of the light irradiated into the light hole 23 through the cover plate 210 are also different, and some light may directly irradiates an inner wall of the light hole 23 because an included angle between the incident angle and the axial direction of the light hole 23 (that is, the z-axis direction) is excessively large. This relatively reduces light propagated to the color temperature sensor 10 and is not conducive to obtaining accurate detection results by the color temperature sensor 10.

Figure 7:
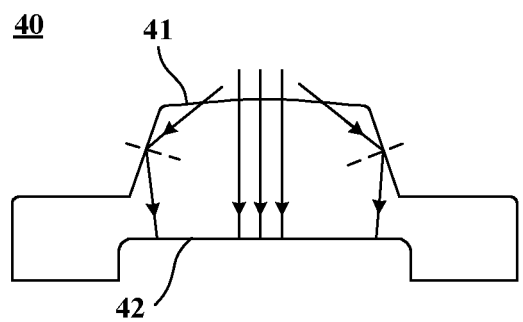
FIG. 7 is a principle diagram of light propagation of a lens provided in an embodiment of the present application.

Based on this, the optical detection assembly 500 may further include a lens 40 for converging ambient light. In a specific implementation, the lens 40 is disposed in the light hole 23 and near the second end 22 of the light shield body 20. The lens 40 has a light inlet side and a light outlet side. When the lens 40 is installed in the light hole 23, the light inlet side of the lens 40 is disposed toward the second end 22 of the light shield body 20, and the light outlet side of the lens 40 is disposed toward the first end 21 of the light shield body 20. Referring to FIG. 7, after entering the light hole 23 from the first end 21 of the light shield body 20, the ambient light enters the lens 40 through the light inlet side 41 of the lens 40. The lens 40 can adjust the ambient light in various incident directions to be approximately parallel to the axial direction of the light hole 23, and then emit the ambient light from the light outlet side 42, so that the light emitted from the light outlet side 42 of the lens 40 can propagate in the adjusted propagation direction to the color temperature sensor 10, and then is collected by the color temperature sensor 10. That is, through light converging action of the lens 40, The lens can converge ambient light from each incident direction into a beam that propagates approximately in an axis direction of the light hole 23, thereby increasing the density of ambient light propagating to the color temperature sensor 10, and improving the accuracy of the detection result of the color temperature sensor 10.

The lens 40 may be prepared from a resin, glass, or the like. In this embodiment of the present application, the lens 40 can transmit visible light in all bands. In this way, even if the light intensity of the ambient light changes after the ambient light passes through the lens 40, the transmittance of the lens 40 for light of all colors can be kept consistent, that is, the transmittance of the lens 40 for visible light of all bands is the same, so that the color temperature of the light remains unchanged after the light passes through the lens 40, thereby ensuring accuracy of the result of detection by the color temperature sensor 10.

In this embodiment of the present application, the light shield body 20 may have a cylindrical structure with the shape similar to the shape of the optical lens 410, for example, the second end 22 of the light shield body 20 may have a cylindrical structure. In this case, the lens disposed in the light shield body 20 is also similar to the lens in the optical lens 410. On the screen 200 side of the electronic device 1, the second end 22 of the light shield body 20 and the light inlet side of the optical lens 410 can be seen through the cover plate 210. Based on the similar appearances of the light shield body 20 and the optical lens 410, the second end 22 of the light shield body 20 and the lens 40 located in the light shield body 20, which are seen by a user, are basically the same as the light inlet side of the optical lens 410. That is, seen from the screen 200 side the optical detection assembly 500 is shaped like a camera, and therefore a visual effect of the appearance of the electronic device 1 can be optimized to a certain extent.

Referring to FIG. 5 and FIG. 6 together, in this embodiment, the light shield body 20 includes a first portion 25 and a second portion 26. The first portion 25 of the light shield body 20 is disposed close to the first end 21 of the light shield body, and the second portion 26 is disposed close to the second end 22 of the light shield body. An outer contour of the first portion 25 exceeds that of the second portion 26. In some implementations, the light shield body 20 has a cylindrical structure. In this case, the first portion 25 may be regarded as a first shaft segment, and the second portion 26 may be regarded as a second shaft segment. A diameter of the first shaft segment 25 is greater than a diameter of the second shaft segment 26. It should be noted that the reference numerals of the first shaft segment and the second shaft segment are the same as those of the first portion 25 and the second portion 26, respectively.

The light hole 23 may be correspondingly divided into a first hole segment 231 located in the first shaft segment 25 and a second hole segment 232 located in the second shaft segment 26. A diameter of the first hole segment 231 is greater than a diameter of the second hole segment 232. In this way, a stepped surface may be formed between the first hole segment 231 and the second hole segment 232, and is denoted as the first stepped surface 233, and the first stepped surface 233 is specifically disposed toward the first end 21 of the light shield body 20. A diameter of one end of the lens 40 close to the light inlet side is less than a diameter of the other end thereof close to the light outlet side. Therefore, a stepped surface is also formed on a peripheral side of the lens 40, and is denoted as the second stepped surface 41, and the second stepped surface 41 is specifically disposed toward the second end 22 of the light shield body 20.

Based on the foregoing structure, when the lens 40 is installed in the light hole 23, one end of the light inlet side of the lens 40 extends into the second hole segment 232, and the second stepped surface 41 of the lens 40 is opposite to the first stepped surfaces 233 in the light hole 23. The two stepped surfaces are bonded to each other by using gum, so as to fix the lens 40 in the light hole 23.

Figure 8:
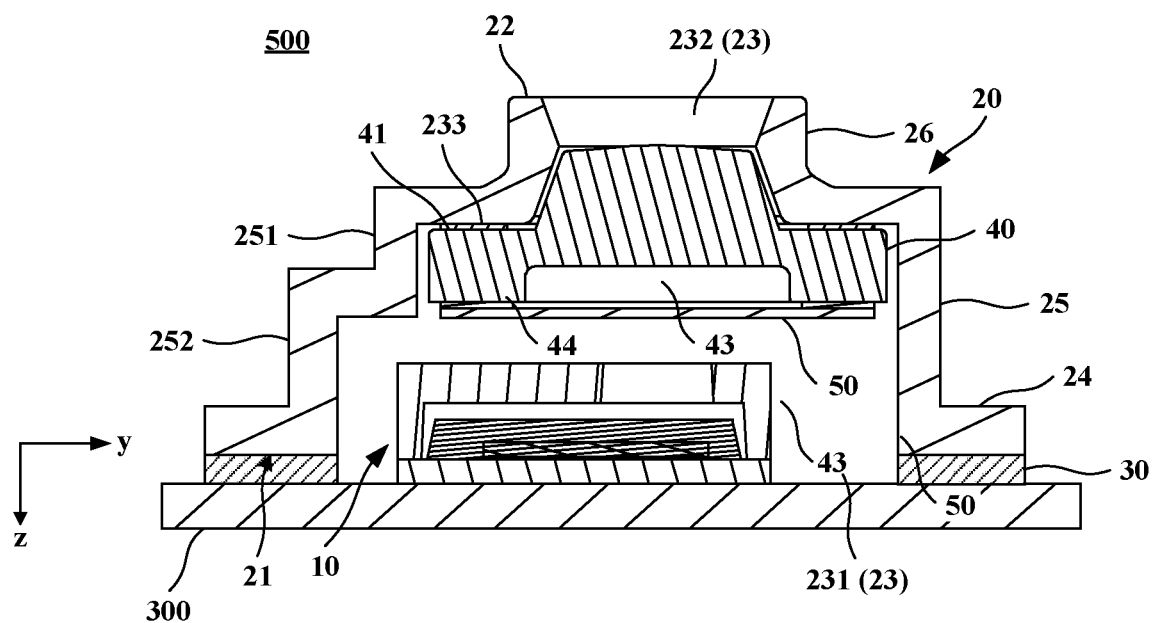
FIG. 8 is another sectional view of an optical detection assembly provided in an embodiment of the present application.

Referring to FIG. 8, FIG. 8 is another sectional view of an optical detection assembly provided in an embodiment of the present application. In some implementations, the light shield body 20 may have an asymmetric structure. In the z-axis direction, the first portion 25 of the light shield body includes an upper portion 251 and a lower portion 252, where the upper portion 251 is disposed close to the second end 22 of the light shield body 20, an outer contour of the upper portion 251 may be circular, and the upper portion 251 may be disposed coaxially with the second portion 26; the lower portion 252 is disposed close to the first end 21 of the light shield body 20, and an outer contour of the lower portion 252 may be a long circle disposed in the y-axis direction. In this way, one side of the lower portion 252 (for example, the left side in FIG. 8) extends beyond the upper portion 251, so that a stepped surface may be formed on the peripheral side of the first portion 25. With such a design, part of the hole segment of the light hole 23 corresponding to the lower portion 252 may also be designed as an oblong hole with an outer contour similar to that of the lower portion 252, so as to accommodate the color temperature sensor 10.

In some embodiments, the optical detection assembly 500 further includes a light homogenizing film 50. The light homogenizing film 50 is fixed to the light outlet side of the lens 40, and may be configured to convert light emitted from the light outlet side of the lens 40 into a surface light source, so that each photosensitive region of the color temperature sensor can receive uniform light with similar intensities, thereby improving the detection accuracy of the color temperature sensor.

When the light homogenizing film 50 is fixed to the lens 40, an edge of the light homogenizing film 50 may be coated with an adhesive, and the light homogenizing film adheres to the edge of the light outlet side of the lens 40. It should be noted that, to avoid blocking the light on the light outlet side, in some implementations, a transparent adhesive may be used for bonding between the light homogenizing film 50 and the lens 40.

In addition, to facilitate the positioning of the light homogenizing film 50 on the lens 40, in some implementations, the light outlet side of the lens 40 is further provided with a groove 43, and a cross section of the groove 43 may be circular. In design, an axis of the groove 43 may coincide with an axis of the lens 40. In this way, an annular boss 44 surrounding the groove 43 may be formed on the light outlet side of the lens 40, and the light homogenizing film 50 may be fixed to the annular boss 44.

In addition, because the light homogenizing film 50 is usually white, to prevent the screen side of the electronic device from appearing white in appearance, in this embodiment of the present application, the lens 40 may be made of a dark tone resin or glass, so that the color of the light homogenizing film 50 can be blocked, so as to improve appearance quality of the electronic device. It should be noted that the dark tone herein may be understood as some dark tones with colors close to or consistent with black, such as black tone, gray tone, or brown tone. In specific arrangement, the lens 40 may be brown, gray, black, black gray, or the like, and no limitation is imposed on this in the present application. When the lens 40 is dark, the lens 40 may be semitransparent, that is, the light transmittance is not 100%.

With reference to FIG. 2 and FIG. 3, a process of adjusting the photographing effect of the front camera module by using the optical detection assembly is described in detail below.

When the electronic device 1 receives the user's front-facing photographing instruction, the CPU controls the color temperature sensor 10 to detect ambient light information on the screen 200 side, and then obtains, by using a related algorithm, the ambient color temperature on the screen 200 side according to the ambient light information detected by the color temperature sensor 10. When the ambient color temperature is excessively low, for example, lower than a reference color temperature (a set color temperature during the design and production of the photosensitive chip of the front camera module, which is generally a standard color temperature), an image photographed by the front camera module 400b is reddish. In this case, the color temperature of the image photographed by the front camera module 400b may be increased, and a blue tone is added to the image to adjust the color of a photographed object, and then a photo with a normal color temperature is generated according to the adjusted color. When the ambient color temperature is excessively high, for example, higher than the reference color temperature, the image photographed by the front camera module 400b is bluish. In this case, the color temperature of the image photographed by the front camera module 400b may be lowered, and the red tone is added to the image to adjust the color of the photographed object, and then a photo with a normal color temperature is generated according to the adjusted color.

In addition, in some other possible implementations, the display color temperature of the screen 200 may alternatively be adjusted by using the color temperature sensor 10 to avoid the problem of color cast occurring when the screen 200 displays. The specific adjustment process is as follows: When the electronic device 1 receives an instruction to adjust the color temperature of the screen 200, the CPU controls the color temperature sensor 10 to detect ambient light information on the screen 200 side, and then obtains, by using a related algorithm, the ambient color temperature on the screen 200 side according to the ambient light information detected by the color temperature sensor 10. When the ambient color temperature is excessively low, for example, lower than the reference color temperature (the set color temperature during the design and production of the display, which is generally the standard color temperature), the display image of the screen 200 is reddish. In this case, the color temperature of the display image of the screen 200 may be increased, a blue tone is added to the image to adjust the display color of the screen 200, and then the screen 200 is controlled to display according to the adjusted color. When the ambient color temperature is excessively high, for example, higher than the reference color temperature, the display image of the screen 200 is bluish. In this case, the color temperature of the display image of the screen 200 may be lowered, the red tone is added to the image, so as to adjust the display color of the screen 200, and then the screen 200 is controlled to display according to the adjusted color.

The above are only specific implementations of the present application, but the protection scope of the present application is not limited thereto, and variations and replacements that may be easily conceived within the technical scope disclosed in the present application by any person skilled in the art should fall within the protection scope of the present application. The embodiments of the present application and features in the embodiments may be combined with each other without conflict. Therefore, the protection scope of the present application should be subject to the protection scope of the claims.

What is claimed is:

1. An electronic device, comprising:
   a screen including a display and a cover plate located on one side of the display;
   a circuit board;
   a middle frame located between the display and the circuit board, and including a first through hole; and
   an optical detection assembly including a light shield body and a light sensor,
   wherein the light shield body includes a light hole,
   wherein a first end of the light shield body is connected to the circuit board,
   wherein a second end of the light shield body passes through the first through hole and extends to one side of the screen facing the middle frame,
   wherein the light sensor is disposed on the circuit board and located in the light hole,
   wherein the display is a non-transparent display that includes a first opening opposite to the first through hole, and
   wherein the second end of the light shield body passes through the first through hole and the first opening in sequence and extends to one side of the cover plate facing the middle frame.

2. The electronic device of claim 1, wherein the first end of the light shield body is hermetically connected to the circuit board.

3. The electronic device of claim 2, wherein the first end of the light shield body includes an extension wall disposed in a circumferential direction, wherein the extension wall is disposed between the middle frame and the circuit board, wherein one side of the extension wall facing the circuit board is hermetically connected to the circuit board, and wherein the other side of the extension wall facing a middle board is fixedly connected to the middle frame.

4. The electronic device of claim 1, further comprising a gap between the second end of the light shield body and the cover plate.

5. The electronic device of claim 4, wherein the gap has a size of 0.11 mm to 0.13 mm.

6. The electronic device of claim 1, wherein the display is a transparent display, and wherein the second end of the light shield body passes through the first through hole and extends to one side of the display facing the middle frame.

7. The electronic device of claim 6, further comprising a gap between the second end of the light shield body and the display.

8. The electronic device of claim 7, wherein the gap has a size of 0.11 mm to 0.13 mm.

9. The electronic device of claim 1, further comprising a light-shielding black glue layer on a surface of the light shield body.

10. The electronic device of claim 1, wherein the optical detection assembly further comprises a lens disposed in the light hole, wherein a light inlet side of the lens is disposed toward the second end of the light shield body, and wherein a light outlet side of the lens is disposed toward the light sensor.

11. The electronic device of claim 10, wherein the light hole comprises:
    a first hole segment is disposed close to the first end of the light shield body; and
    a second hole segment disposed close to the second end of the light shield body,
    wherein a first stepped surface disposed toward the first end of the light shield body is formed between the first hole segment and the second hole segment,
    wherein a peripheral side of the lens includes a second stepped surface disposed toward the second end of the light shield body,
    wherein one end of the light inlet side of the lens extends into the second hole segment, and
    wherein the second stepped surface is opposite to and fixedly connected to the first stepped surface.

12. The electronic device of claim 10, wherein the optical detection assembly further comprises a light homogenizing film disposed on the light outlet side of the lens.

13. The electronic device of claim 10, wherein the lens is dark in color.

14. The electronic device of claim 1, wherein the light sensor is a color temperature sensor or an ambient light sensor.

15. The electronic device of claim 1, wherein the middle frame includes a second through hole, and wherein the electronic device further comprises a camera module including an optical lens, wherein a light inlet side of the optical lens passes through the second through hole and extends to one side of the screen facing the middle frame.

16. An electronic device, comprising:
    a screen including a display and a cover plate;
    a circuit board;

a middle frame located between the screen and the circuit board and including a first through hole and a second through hole, wherein the cover plate is located on one side of the display that faces away from the middle frame, wherein the display includes a first opening opposite to the first through hole and a second opening opposite to the second through hole, and wherein the first opening communicates with the second opening to be a whole;

an optical detection assembly, comprising:
- a light shield body comprising:
  - a first end that includes an extension wall disposed in a circumferential direction, wherein the extension wall is disposed between the middle frame and the circuit board, wherein one side of the extension wall that faces the circuit board is hermetically connected to the circuit board, wherein the other side of the extension wall faces a middle board and is fixedly connected to the middle board;
  - a second end of the light shield body that passes through the first through hole and the first opening in sequence and extends to one side of the cover plate facing the middle frame; and
  - a light hole that penetrates from the first end to the second end, the light hole including a first hole segment and a second hole segment, wherein the first hole segment is disposed close to the first end of the light shield body, wherein the second hole segment is disposed close to the second end of the light shield body, and wherein a first stepped surface disposed toward the first end of the light shield body is formed between the first hole segment and the second hole segment;
- a light sensor disposed on the circuit board and located in the light hole;
- a lens disposed in the light hole, wherein a light inlet side of the lens is disposed toward the second end of the light shield body, wherein a light outlet side of the lens is disposed toward the light sensor, wherein a peripheral side of the lens includes a second stepped surface disposed toward the second end of the light shield body, wherein one end of the light inlet side of the lens extends into the second hole segment, wherein the second stepped surface is opposite to and fixedly connected to the first stepped surface, and wherein the lens is dark in color; and
- a light homogenizing film disposed on the light outlet side of the lens, wherein the light homogenizing film is white; and a camera module including an optical lens, wherein a light inlet side of the optical lens passes through the second through hole and extends into the second opening, and wherein a distance between the optical lens and the shield body of the optical detection assembly is less than 1 cm.

17. An in-screen optical detection assembly, comprising:
a light shield body, comprising:
  a first end;
  a second end opposite to the first end;
  a light hole that penetrates from the first end to the second end, wherein the light hole comprises:
    a first hole segment disposed close to the first end of the light shield body; and
    a second hole segment disposed close to the second end of the light shield body, wherein a first stepped surface disposed toward the first end of the light shield body is formed between the first hole segment and the second hole segment;
  a light sensor located in the light hole, wherein a photosensitive region of the light sensor is disposed toward the second end; and
  a lens disposed in the light hole, wherein a peripheral side of the lens includes a second stepped surface disposed toward the second end of the light shield body.

18. The in-screen optical detection assembly of claim 17, wherein a light inlet side of the lens is disposed toward the second end of the light shield body, and wherein a light outlet side of the lens is disposed toward the light sensor.

19. The in-screen optical detection assembly of claim 18, wherein one end of the light inlet side of the lens extends into the second hole segment, and wherein the second stepped surface is opposite to and fixedly connected to the first stepped surface.

\* \* \* \* \*

UNITED STATES PATENT AND TRADEMARK OFFICE
CERTIFICATE OF CORRECTION

PATENT NO. : 11,956,550 B2
APPLICATION NO. : 17/776853
DATED : April 9, 2024
INVENTOR(S) : Shengxi Yang It is certified that error appears in the above-identified patent and that said Letters Patent is hereby corrected as shown below:

In the Claims

Claim 16, Column 23, Line 20: "second end of the light shield body that passes" should read "second end that passes"

Signed and Sealed this
Fourteenth Day of May, 2024

Katherine Kelly Vidal
*Director of the United States Patent and Trademark Office*